July 5, 1960 L. SCHMID 2,943,770
MEASURING DEVICES FOR FLUIDS
Filed June 25, 1958 3 Sheets-Sheet 1

INVENTOR.
L. Schmid
BY
Lowry & Rinehart
ATTYS.

July 5, 1960

L. SCHMID 2,943,770

MEASURING DEVICES FOR FLUIDS

Filed June 25, 1958

INVENTOR.
L. Schmid
BY
Lowry + Rinehart
ATTYS.

United States Patent Office 2,943,770
Patented July 5, 1960

2,943,770
MEASURING DEVICES FOR FLUIDS

Leonhard Schmid, 5 Kilianstrasse, Augsburg, Germany

Filed June 25, 1958, Ser. No. 744,444

Claims priority, application Germany July 8, 1957

2 Claims. (Cl. 222—440)

The invention concerns a measuring device for fluids, more especially for supplying water to concrete mixing machines.

In contradistinction to known constructions an object of the invention is to provide a measuring device which is unaffected by oscillations and appropriately able to resist the harsh demands of building operations.

A known measuring device includes toothed rods fixed to a jacket of a measuring container which in vertical arrangement, project outwardly where they are guided in longitudinal grooves each in a guide stand and which engage with toothed racks each connected to a shaft and each having a worm wheel. Both worm wheels are simultaneously rotatable together, by way of a transverse shaft by means of worms of a hand crank. This displacement mechanism requires an accurate interengagement of all its members if an opposite jamming together of the two toothed rods is to be excluded, which however is necessary for raising and lowering the measuring container securely in operation. Furthermore, it is complex and expensive and requires much space.

When solving this problem particular attention must be paid to simplicity and cheapness and, if the device is to be widely used, it is necessary for the quality of the concrete mixtures, which are produced with mixing machine equipped with the new measuring device, to be high.

According to the present invention a measuring device for fluids, more especially for use with concrete mixers, comprises a dipping tube centrally discharging into a vertically displaceable measuring container, the tube being non-displaceable vertically and, at its lower end, is connected with a member controlling the fluid inlet and discharge, an axially displaceable screwed hollow spindle being secured at the lower side of the measuring container, which spindle surrounds the dipping tube and is adapted to be screwed in or out of a screw threaded stand secured to a concrete mixer. The dipping depth determining the amount of fluid is therefore adjusted by turning of the measuring container, and due to this construction, a separate hand crank and displacement transmission member connected therewith are dispensed with. The screw acting as the displacement mechanism is disposed under the protecting part of the measuring container; the screw remains in any adjusted position and is self supporting; it is simple to produce and requires no particular accuracy. Thereby the new device is simple, cheap and compact.

The dipping tube may be rotatable through about 180° together with the fluid inlet and discharge controlling member around the longitudinal axis of the dipping tube. In this way fluid can be fed into the mixing drum aperture with a fixed tube bend for the fluid discharge on both sides of the longitudinal medial plane of the machine which, above all, is desired with rotating drum mixers.

The fluid inlet and discharge controlling member may be constructed as a two way cock with a connection for fluid inlet on the cock casing and connection for the fluid discharge in the cock rotor. Furthermore a rigid tube bend is provided for the fluid discharge which at the same time acts as the cock rotor key. The swinging in and out of the feed tube into or as the case may be out of the region of the mixing drum aperture hence at the same time positions the cock. The manipulation is as simple as is conceivable, convenient and foolproof.

The invention will be described further, by way of example, with reference to the accompanying drawings, in which.

Figure 1:
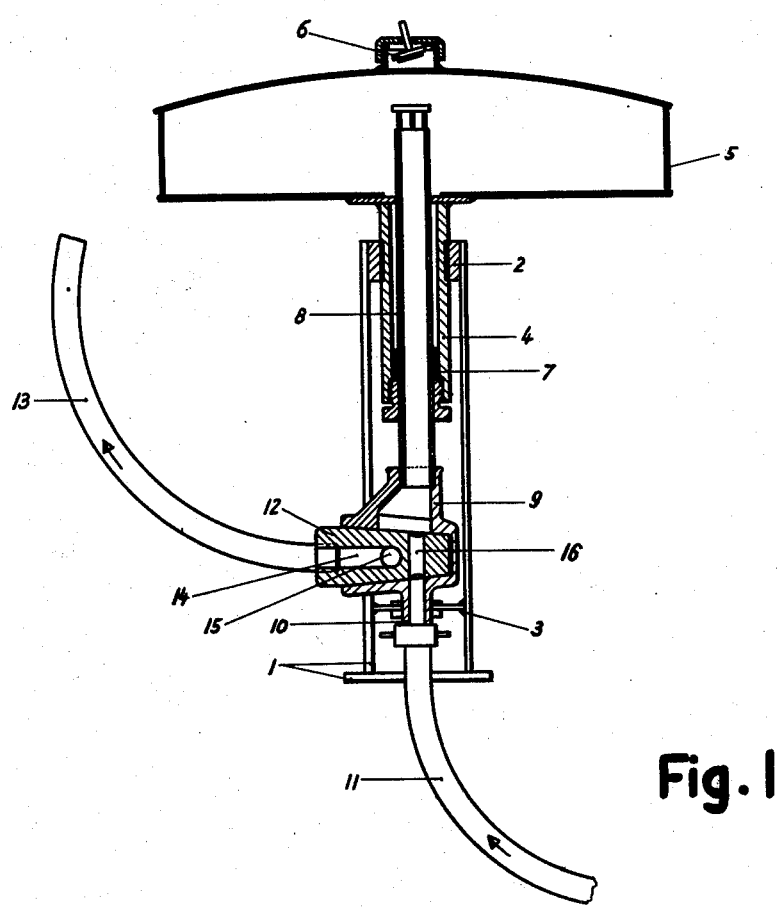
Fig. 1 is a vertical section of a preferred embodiment of the invention.
Figure 2:
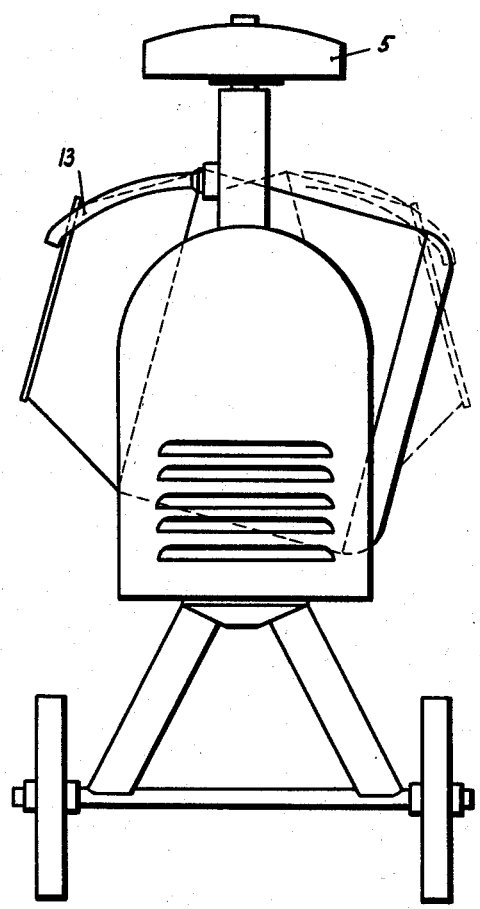
Fig. 2 is an elevation of the device mounted on rotating drum mixer.
Figure 3:
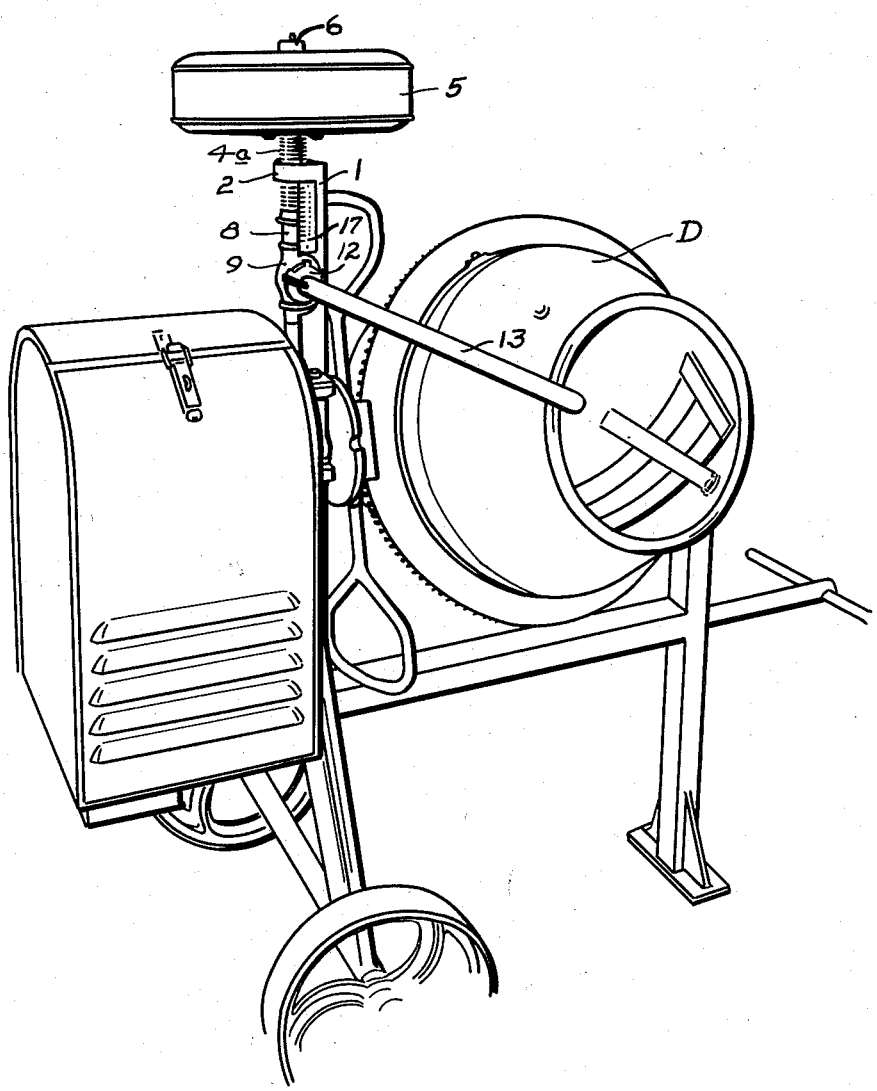
Fig. 3 is a perspective view showing the fluid measuring device in association with a concrete mixer.

On one of the platforms of a concrete mixing machine having a rotating drum, conveniently on the platform disposed between rotating drum and motor, there is fixed a stand 1 provided with apertures. The stand carries a screw insert 2 at its top and a holding insert 3 at its bottom. A threaded portion 4a of a hollow spindle 4 is adapted to be screwed up or down into the screw insert 2, which spindle 4 is secured to the lower side of a measuring container 5 having shifting valve 6. A dipping tube 8 is mounted in the hollow spindle 4 and secured in position by a sealing sleeve 7. A valve housing 9 is secured at the lower end of the dipping tube 8; a connection 10 of the valve housing 9 is connected with a water inlet hose 11 which is not axially slidable in the retaining insert and the stand 1, but is, however, rotatable about the longitudinal axis of the dipping tube 8. A valve rotor 12, as shown in Fig. 1, is pivotable through about 180° around the longitudinal axis of the dipping tube 8, which allows of the withdrawal into the casing of the stand 1. A feed tube end 13 is connected in the direction of the valve rotor longitudinal axis, the outlet of which thus, as can be seen from the two indicated positions in Fig. 2, can either feed one side of the longitudinal medial plane of the machine or on the other side into the aperture of the mixing drum D. In the feed position of the valve rotor 12, a channel 14 is disposed in the connection to the tube end 13 of the valve in connection with the dipping tube 8 by way of a radial channel 15, whereby the liquid lying in the measuring container 5 runs out up to the overflow edge of the dipping tube 8. Thereupon the feed tube end 13 is swung upwardly whereby the aforementioned channel connection is interrupted and a channel connection 16 is produced between the inlet hose 11 and dipping tube 8. The measuring container 5 is again filled to the top until the shifting valve 6 automatically closes. The device is thereupon again ready for a fresh charging. The charge supplied at any time is defined by means of the dipping-in depth of the dipping tube 8 into the measuring container 5 and can be adjusted by means of screwing in or out of the measuring container 5 on the screw insert. The adjustment can be marked externally by means of a scale 17.

What I claim is:

1. Apparatus for supplying fluid to a concrete mixing machine, comprising a dipping tube restrained from vertical movements, a measuring container vertically adjustable on the upper end of the dipping tube, a valve housing at the lower end of the dipping tube, fluid supply means entering the lower side of the valve housing, a rotatable two-way valve core in the valve housing with the axis of rotation of the valve core being normal to the longitudinal axis of the dipping tube, an arcuate delivery pipe having one end connected to the two-way valve core and acting as a handle for the operation of said valve core, and said valve core being rotatable selectively to form communication between the fluid supply means and the dipping tube, and the dipping tube and the arcuate delivery pipe.

2. Apparatus as in claim 1, wherein the supply of fluid from the measuring container to the delivery pipe is cut off by the two-way valve core when the arcuate delivery pipe has its discharge end directed upwardly.

References Cited in the file of this patent

UNITED STATES PATENTS

| | | |
|---|---|---|
| 1,835,039 | Guest et al. | Dec. 8, 1931 |
| 1,927,447 | Rybeck | Sept. 19, 1933 |
| 1,973,167 | Heine | Sept. 11, 1934 |